United States Patent

[11] 3,616,268

| [72] | Inventor | Philip J. Philliou |
| | | Fort Lee, N.J. |
| [21] | Appl. No. | 801,400 |
| [22] | Filed | Feb. 24, 1969 |
| [45] | Patented | Oct. 26, 1971 |
| [73] | Assignee | The Lummus Company |
| | | Bloomfield, N.J. |

[54] ACETIC ACID RECOVERY FROM AQUEOUS SOLUTION BY DISTILLATION AND CRYSTALLIZATION
5 Claims, 1 Drawing Fig.

[52] U.S. Cl.................................................. 203/16,
203/48, 203/98, 62/58, 260/541, 260/707
[51] Int. Cl....................................................... B01d 9/04,
C07c 53/08
[50] Field of Search........................................... 203/16, 48,
98; 260/541, 707; 62/58

[56] References Cited
UNITED STATES PATENTS
1,792,113  2/1931  Mugdan et al................  260/541
2,010,548  8/1935  Languell et al...............  260/541
3,358,464  12/1967  Malick et al..................  203/48

*Primary Examiner*—Wilbur L. Bascomb, Jr.
*Attorney*—Marn & Jangarathis

ABSTRACT: A process for recovering acetic acid from dilute aqueous solutions thereof wherein the dilute acetic acid is introduced into a fractionator to produce an acetic acid bottoms and a dilute acetic acid overhead, containing between about 7 and about 10 weight percent acetic acid, the remainder being water. The overhead is then cooled to a temperature at which a portion of the water solidifies, thereby producing a slurry of ice crystals in a concentrated acetic acid mother liquor, containing between about 11 and about 55 weight percent acetic acid, with the remainder being water. The ice is separated from the mother liquor and a major portion of the mother liquor is recycled to the fractionator to effect recovery of acetic acid. The remaining portion of the mother liquor is combined with the overhead, prior to cooling, to regulate the slurry consistency.

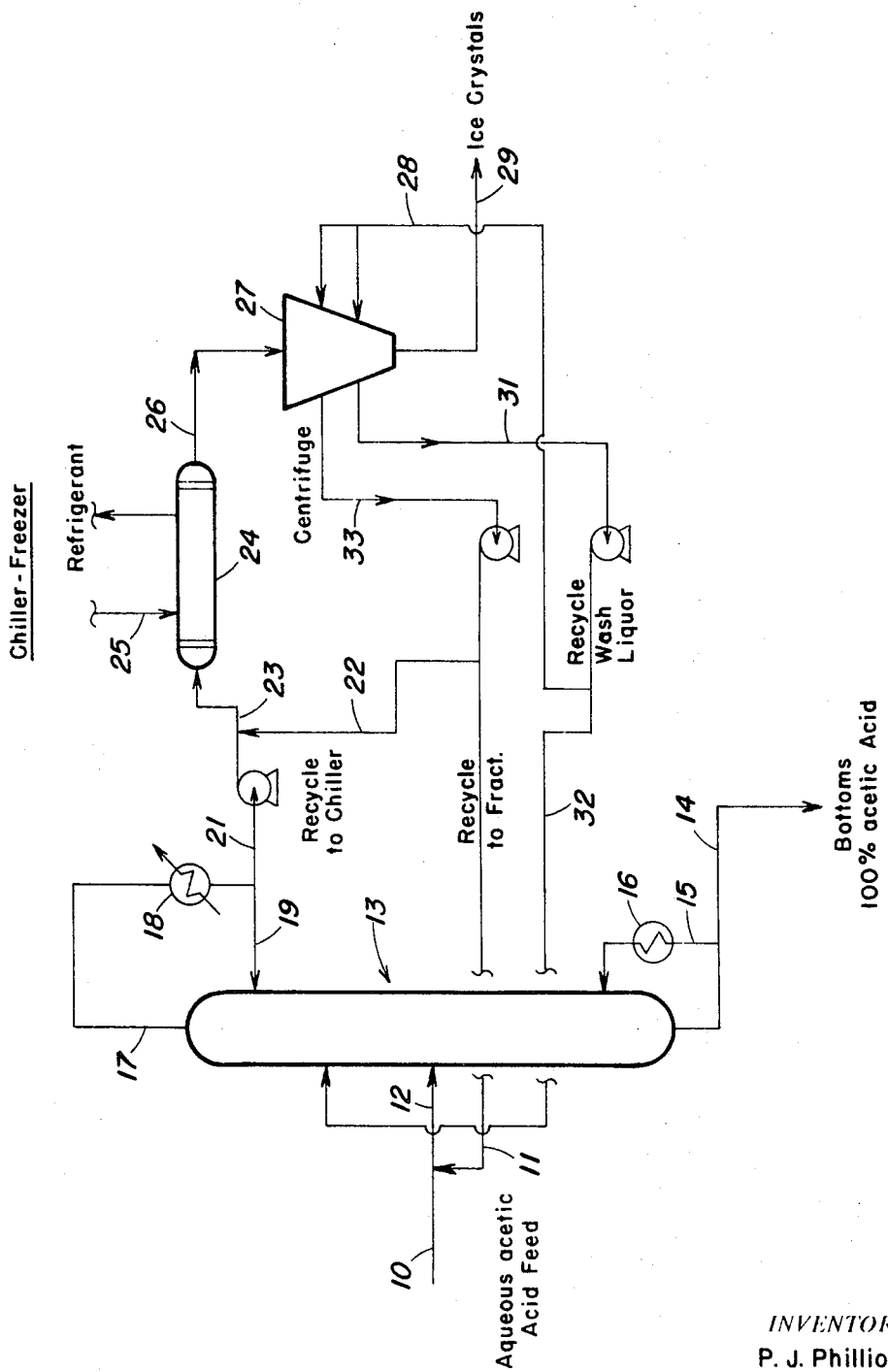

3,616,268

ACETIC ACID RECOVERY FROM AQUEOUS SOLUTION BY DISTILLATION AND CRYSTALLIZATION

This invention relates to the production of acetic acid and more particularly to a new and improved process for recovering acetic acid from dilute solutions thereof.

In a wide variety of processes, the recovery of acetic acid from dilute solutions thereof is an important step in the overall process. A wide variety of methods have been employed for concentrating dilute acetic acid including distillation techniques wherein water is separated as an overhead. The overhead from the initial distillation contains as much as seven weight percent acetic acid which represents a potential product loss and the recovery of the acetic acid from this overhead by further fractionation is uneconomical. Consequently, there is a need for a more efficient and economical method for concentrating acetic acid.

Accordingly, an object of this invention is to provide a new and improved process for recovering acetic acid.

Another object of this invention is to provide a process for concentrating acetic acid.

Still another object of this invention is to provide a process for recovering acetic acid from dilute solutions thereof which minimizes product loss.

These and other objects of the invention should become more apparent from the following detailed description thereof when read with reference to the accompanying drawing wherein:

The drawing is a simplified schematic flow diagram of an embodiment of the invention.

The objects of this invention are broadly accomplished by introducing an aqueous acetic acid solution into a fractionator wherein acetic acid is recovered as bottoms. The overhead, comprised of a dilute aqueous solution of acetic acid is then cooled to a temperature at which a portion of the water solidifies, producing a slurry of ice in a mother liquor of more concentrated acetic acid. The ice is separated from the mother liquor and all or a portion thereof is recycled to the fractionator to effect recovery of the acetic acid.

The invention will now be described in more detail with reference to a specific embodiment thereof illustrated in the drawing. It is to be understood that the embodiment is only illustrative of the invention and, therefore, does not limit the scope thereof. It is also to be understood that equipments, such as pumps, valves, etc. have been omitted from the drawing to facilitate the description thereof and the use of such equipments at appropriate places is within the scope of those skilled in the art.

Referring now to the drawing, an aqueous acetic acid feed in line 10, generally containing between about 50 and about 80 weight percent acetic acid, the remainder being water combined with concentrated acetic acid mother liquor in line 11, obtained as hereinafter described, and the mixture in line 12 introduced into a fractionator 13. The fractionator 13 is operated at a temperature and pressure to produce a bottoms of essentially 100 percent acetic acid, and an overhead comprised of water and some acetic acid.

A bottoms comprised of essentially 100 percent acetic acid is withdrawn from fractionator 13 through line 14 and a portion thereof recycled to fractionator 13 through line 15 and reboiler 16 to supply the heat requirements therefor. An overhead comprised of a dilute aqueous solution of acetic acid, generally containing between about 7 and about 10 weight percent of acetic acid, the remainder being water, is withdrawn from fractionator 13 through line 17, passed through condenser 18 to effect condensation thereof and a portion recycled to fractionator 13 through line 19 to meet the reflux requirements therefor. The remaining portion of the dilute acetic acid in line 21 is combined with concentrated acetic acid mother liquor in line 22, obtained as hereinafter described, and the mixture in line 23 passed through a heat exchanger 24. The heat exchanger 24 is supplied with a suitable refrigerant through line 25 at a temperature and flow rate such that a portion of the water of the dilute acetic acid solution flowing therethrough freezes. The temperature conditions in heat exchanger 24 are regulated to produce a mother liquor containing between about 11 and about 55 weight percent of acetic acid, the remainder being water, such temperatures generally being between about 25° and about −10° F.

A slurry of ice crystals in concentrated acetic acid from heat exchanger 24 in line 26 is introduced into a centrifuge 27 to effect separation of ice from the concentrated acetic acid. The ice crystals are washed in the lower portion of centrifuge 27 with a dilute aqueous acetic acid introduced through line 28, with the ice crystals being withdrawn from the centrifuge 27 through line 29. The dilute acetic acid wash is withdrawn from centrifuge 27 through line 31 and a portion thereof introduced as a sidestream into the upper portion of fractionator 13 through line 32. The remaining portion of the dilute acetic acid is recycled to the centrifuge 27 through line 28.

A mother liquor of concentrated acetic acid is withdrawn from centrifuge 27 through line 33 and a portion thereof passed through line 22 for the dilute with the dilute aqueous acetic acid in line 21. The mother liquor passed through line 22 is employed to control the slurry consistency in heat exchanger 24 and also minimizes the recycle to fractionator 13. The remainder of the concentrated acetic acid mother liquor in line 11 is combined with the feed to the fractionator in line 10 to effect recovery of acetic acid. The mother liquor in line 11 may be introduced into the fractionator at a point other than the point of introduction of the feed depending on the acetic acid concentration thereof, i.e., the mother liquor is preferably introduced into the tower at a point having an acetic acid concentration corresponding to that of the mother liquor.

It is to be understood that within the spirit and scope of the invention, the process of the invention may be practiced otherwise than as hereinabove particularly described. Thus, for example, a filter or other separation device may be employed instead of a centrifuge. As another modification, the cooling of the dilute acetic acid to effect crystallization may be effected in a manner other than by indirect heat transfer. These and other modifications are deemed to be within the scope of those skilled in the art from the teachings contained herein.

The following example further illustrates the invention and it is to be understood that the scope of the invention is not to be limited thereby.

EXAMPLE

The conditions tabulated below are employed to concentrate an aqueous solution of acetic acid, containing 50 weight percent acetic acid, the remainder being water. The fractionator 13 is operated at an overhead temperature of 215° F., a bottoms temperature of 255° F., and a pressure of 5 p.s.i.g. to produce an overhead comprised of 93 weight percent water and 7 weight percent acetic acid. The mother liquor withdrawn from heat exchanger 24 contains 55 weight percent water and 45 weight percent acetic acid.

TABLE

| Line | Temp. °F. | Flow Rate No./hr. |
|---|---|---|
| 10 | 100 | 10,000 |
| 11 | 0 | 920.8 |
| 14 | 255 | 5,000 |
| 17 | 215 | 21,000 |
| 21 | 125 | 5920.8 |
| 22 | 0 | 9079.2 |
| 26 | 0 | 15,000 |
| 29 | 0 | 5,000 |
| 33 | 0 | 10,000 |

The process of the invention is extremely effective for concentrating aqueous solutions of acetic acid. In combining fractionation with freeze separation of the overhead, the final product loss is minimized without entailing the additional costs required by additional fractionation.

Numerous modifications of the present invention are possible from the teachings contained herein and, therefore, it is to be understood that within the scope of the appended claims, the invention may be practiced otherwise than as specifically described.

1. A process for recovering acetic acid from an aqueous solution of acetic acid comprising:
   a. introducing an aqueous solution of acetic acid containing from about 50 percent to about 80 percent, by weight, of acetic acid, into a fractional distillation zone to produce a bottoms of essentially 100 percent acetic acid and a dilute aqueous acetic acid overhead; b. recovering the overhead from the fractional distillation zone;
   c. cooling the overhead to crystallize a portion of the water therein and produce a slurry of ice crystals in a mother liquor, containing from about 11 percent to about 55 percent, by weight, of acetic acid;
   d. separating the ice crystals from the mother liquor; and
   e. recycling at least a portion of the mother liquor to the fractional distillation zone to recover acetic acid therefrom.

2. The process as defined in claim 1 and further comprising: combining a portion of the mother liquor with the overhead prior to step (c).

3. The process as defined in claim 2 and further comprising: washing the ice crystals with a wash liquor of dilute acetic acid; recovering the wash liquor and passing a portion of said recovered wash liquor to the fractional distillation zone.

4. The process as defined in claim 3 wherein the overhead contains between about 7 and about 10 weight percent acetic acid, with the remainder being water.

5. The process as defined in claim 4 wherein the overhead is cooled to a temperature between about 25° and about −10° F. to produce the ice crystals.

* * * * *